(12) United States Patent
Ryu

(10) Patent No.: US 7,663,706 B2
(45) Date of Patent: Feb. 16, 2010

(54) IN-WALL TYPE MULTI-FUNCTIONAL TELEVISION SET

(75) Inventor: Gong-hyun Ryu, Sungnam-si (KR)

(73) Assignee: Costel Co., Ltd. (KR)

( * ) Notice: Subject to any disclaimer, the term of this patent is extended or adjusted under 35 U.S.C. 154(b) by 44 days.

(21) Appl. No.: 10/562,546

(22) PCT Filed: Jan. 31, 2005

(86) PCT No.: PCT/KR2005/000285

§ 371 (c)(1),
(2), (4) Date: Dec. 29, 2005

(87) PCT Pub. No.: WO2005/120053

PCT Pub. Date: Dec. 15, 2005

(65) Prior Publication Data

US 2007/0058092 A1    Mar. 15, 2007

(30) Foreign Application Priority Data

Jun. 3, 2004  (KR) ............... 10-2004-0040524
Aug. 27, 2004  (KR) ............... 10-2004-0068140

(51) Int. Cl.
*H04N 5/64* (2006.01)
(52) U.S. Cl. ............... 348/836; 248/917; 248/324; 248/282.1; 361/679.01
(58) Field of Classification Search ............... 348/836, 348/837, 787–789; 361/679.01–679.61, 361/681; 248/917, 324, 921, 278.1, 282.1
See application file for complete search history.

(56) References Cited

U.S. PATENT DOCUMENTS 6,466,278 B1 * 10/2002  Harrison et al. ............... 348/836

6,731,350 B2 * 5/2004  Endo et al. ............... 348/837

(Continued)

FOREIGN PATENT DOCUMENTS

JP  03078385  4/1991

(Continued)

OTHER PUBLICATIONS

Korean Office Action, Application No. 119980038928, Dated Jul. 11, 2004.

(Continued)

*Primary Examiner*—M. Lee
(74) *Attorney, Agent, or Firm*—Cantor Colburn LLP

(57) ABSTRACT

An in-wall type multi-functional television set being embedded in the wall of home, accommodated and withdrawn from the wall. The in-wall type multi-functional television set includes a main body having an accommodating part provided at a front side of the main body, an input part with a plurality of input keys provided at a side of the main body, a television signal receiving circuit for receiving and outputting a broadcast television signal, speakers for outputting an audio signal received from the television signal receiving circuit, and a controller for controlling the in-wall type multi-functional television set, a monitor, accommodated in and withdrawn from the accommodating part of the main body, for displaying the video signal received from the television signal receiving circuit, and a connecting part having an end portion connected to the accommodating part and the other end portion connected to the monitor.

4 Claims, 11 Drawing Sheets

U.S. PATENT DOCUMENTS

| | | | |
|---|---|---|---|
| 7,028,961 B1 * | 4/2006 | Dittmer et al. | 248/278.1 |
| 2001/0043455 A1 * | 11/2001 | Bertagna | 361/681 |
| 2002/0051098 A1 * | 5/2002 | Morita et al. | 348/836 |
| 2004/0155167 A1 * | 8/2004 | Carter | 248/324 |

FOREIGN PATENT DOCUMENTS

| | | |
|---|---|---|
| JP | 1996-098116 | 4/1996 |
| JP | 3079559 | 8/2001 |
| JP | 2001252140 | 9/2001 |
| KR | 1999-001799 | 1/1999 |
| KR | 2000-023904 | 5/2000 |
| KR | 20-0193679 | 8/2000 |

OTHER PUBLICATIONS

International Search Report, Application No. PCT/KR2005/000285, Dated Jun. 27, 2005.

Japanese Office Action issued Nov. 25, 2008, citing JP 03-078385 and JP 2001-252140 being submitted.

English Translation of Japanese Office Action issued Nov. 25, 2008, citing JP 03-078385 and JP 2001-252140 being submitted.

* cited by examiner

IN-WALL TYPE MULTI-FUNCTIONAL TELEVISION SET

TECHNICAL FIELD

The present invention relates to a multi-functional television set, and more particularly to a multi-functional television set embedded in a wall of a house and accommodated in and withdrawn from the wall.

BACKGROUND ART

Rapid development of industry causes modern people to consider a house not only as a residential space, and technologies are proposed to provide convenience to residents at home. Generally, a television set is placed in a living room where the residents spend a lot of time. However, the majority of modern daily family life is spent in a kitchen where meals are had. Particularly, housewives, who spend most of their daily working time in the kitchen, are interested in technologies that can make their work in the kitchen more convenient. Television sets and audio sets attachable to wall cabinets in kitchens have been developed so that housewives or housekeepers can view broadcast programs and listen to music through the television sets and the audio sets even when they are working in the kitchen.

DISCLOSURE OF INVENTION

Technical Problem

However, these technologies have drawbacks that the fixed television sets and the fixed audio sets do not allow viewers to watch television and listen to music at desired places.

Moreover, in the event of installing the devices in kitchens as well as other places, additional spaces to install the devices must be provided. In addition, the problem exists that the internal circuitry of these devices is easily damaged by contact with water in the form of moisture and humidity.

Technical Solution

Therefore, the present invention has been made in view of the above and/or other problems, and it is an object of the present invention to provide an in-wall type multi-functional television set accommodated in and withdrawn from a wall.

It is another object of the present invention to provide an in-wall type multi-functional television set in which the viewing angle of a monitor's withdrawn from the wall can be freely adjusted.

It is a further object of the present invention to provide an in-wall type multi-functional television set for performing a videophone function to conduct audio/video calls with an outdoor interphone.

It is another object of the present invention to provide an in-wall type multi-functional television set for receiving a call from the exterior.

It is yet another object of the present invention to provide an in-wall type multi-functional television set having an odor-removing device for removing offensive odors from the room.

It is yet another object of the present invention to provide an in-wall type multi-functional television set for controlling home appliances through an interface with home automation installed in the house.

It is yet another object of the present invention to provide an in-wall type multi-functional television set for preventing internal circuits from being damaged by water, moisture, humidity, and the like.

In accordance with the present invention, the above and other objects can be accomplished by the provision of an in-wall type multi-functional television set including a main body installed on a bottom side of a kitchen cabinet, in the kitchen wall, or in wall adjacent to a diner table, and a monitor, connected by a connecting part, for displaying a video image outputted from the main body. Based on manipulation commands inputted by a user, the main body receives a broadcast television signal through a tuner installed in the main body and extracts a video signal and an audio signal from the broadcast television signal. The main body transmits the extracted video signal to the monitor and outputs the extracted audio signal to speakers.

Preferably, the monitor is accommodated in a certain space formed in the main body by the connecting part. One side of the connecting part is connected to the main body and the other side of the connecting part is connected to a horizontally-rotatable rotating part of the monitor, so that the monitor can be accommodated in a certain space of the main body. The user can adjust the viewing angle by withdrawing the monitor from the main body. The monitor includes a monitor such as a liquid crystal display and displays the video signal through the monitor by receiving the video signal outputted from the main body. Thus, the user easily withdraws the accommodated monitor to watch television and can conveniently adjust the viewing angle in accordance with their position.

According to the second aspect of the present invention, the present invention provides an in-wall type multi-functional television set embedded in the wall of the kitchen. The in-wall type multi-functional television set includes a main body including an accommodating part formed in the front side of the main body, a television signal receiving circuit for receiving and outputting a television signal, a housing including a controller for controlling all the devices in the in-wall type multi-functional television set, and a case including an input part provided with a plurality of input buttons and speakers for outputting an audio signal, and a monitor accommodated in the accommodating part by means of a connecting part which has cables for transmitting the television video signal outputted from the television signal receiving circuit, and withdrawn from the accommodating part by a user, and displaying a video signal transmitted through the cables. The main body receives commands which are inputted by a user and the broadcasting television signal, separates the video signal and the audio signal from the received broadcasting television signal, and transmits the video signal to the monitor through the cables and the audio signal to the speakers.

The monitor is accommodated in the accommodating part formed in the main body, by the connecting part. The user withdraws the monitor from the accommodating part and adjusts its viewing angle according to a their wishes. The monitor includes a display such as a liquid crystal display and displays the video signal outputted from the main body through the display.

The connecting part includes a hollow cable passage through which the cables for transmitting the television signal outputted from the television signal receiving circuit to the video processing circuit pass, and includes an end hinged to a first rotating part pivotably installed to the accommodating part, and the other end hinged to a second rotating part pivotably installed to the rear side of the monitor. Thus, the user withdraws the monitor from the accommodating part in order to watch TV, and adjusts the viewing angle of the monitor according to their position.

According to the aspect of the present invention, the in-wall type multi-functional television set further includes waterproofing packings having slits through which the cables pass, and inserted between the first rotating part and the accommodating part, and between the second rotating parts and the rear side of the monitor. Thus, the waterproofing packings prevent water or humidity from entering the in-wall type multi-functional television set through the cables, and the cables are fixedly placed in the waterproofing packings.

According to the additional aspect of the present invention, the in-wall type multi-functional television set further includes a guide plate integrally formed with the case, having a wide upper side and a narrow lower side, and guiding water, moisture, of humidity entered into the case through the input part and the speakers to flow toward a desired space in the case, and a drain hole for draining the water, the moisture, or the humidity, gathered by the guide plate provided at the bottom of the case, out of the case.

The in-wall type multi-functional television set according to the present invention further includes a fixing device for firmly fixing the monitor to the accommodating part when accommodating the monitor. Thereby the monitor is prevented from being unintentionally withdrawn from the main body due to external force.

The in-wall type multi-functional television set provides an interphone function for communicating with the other party at the entrance of a house audibly and visually. Most home entrances are installed with an interphone for communicating with residents in the home. When the visitor presses a bell of the interphone, the main body of the in-wall type multi-functional television set detects that the bell has been pressed and informs the residents that a visitor has arrived at the entrance by outputting an notification through the speakers or the monitor.

The residents receive a corresponding call signal through an input part of the main body. An interphone processor receives a video signal and an audio signal outputted from a camera and an interphone microphone of the interphone installed at the entrance. By the interphone processor, the received video signal is outputted to a video selector of the main body, and the received audio signal is outputted to an audio selector. The interphone processor receives an audio signal from a main body microphone provided in the main body and outputs the received audio signal to the entrance interphone. Thus, the user can identify the visitor at the entrance and communicate with the visitor at a place where the main body is installed.

The in-wall type multi-functional television set is connected to a public telephone network so that the television set can receive an incoming call from the exterior. When a call is received from the exterior through the public telephone network, the main body detects a ring signal among telephone signals and outputs the ring signal through the speakers installed in the main body. The main body also outputs an informing message to the monitor so as to inform the residents of the incoming call. The user receives the call through the input which is installed in the main body and has a plurality of input keys. The telephone circuit outputs the audio signal inputted from the public telephone network through the speakers. The telephone circuit receives the user's audio signal inputted from the main body microphone and outputs the user's audio signal to the public telephone network. Thus, the user can freely answer the call even in the kitchen or bathroom where the telephone is not provided.

The in-wall type multi-functional television set according to the present invention further includes an odor-removing device for removing indoor odor. The odor-removing device includes a basidiomycota mycelium bag and a heating unit provided with an electric heating device. The cultivated basidiomycota mycelium when infrared rays are projected thereon from the heating unit activates oxygen in the air so as to neutralize the positive ions which generate odors.

The main body of the in-wall type multi-functional television set further includes a home automation interface. The home automation interface is electrically connected to a computer for controlling a home automation. The home automation interface receives and transmits manipulation commands from and to home appliances installed in the house. Thus, the user can control a variety of home appliances installed in the house by transmitting the manipulation commands through the in-wall type multi-functional television set of the present invention.

DESCRIPTION OF DRAWINGS

These and/or other objects and advantages of the present invention will become apparent and more readily appreciated from the following description of the embodiments, taken in conjunction with the accompanying drawings, in which.

BEST MODE

Figure 1:
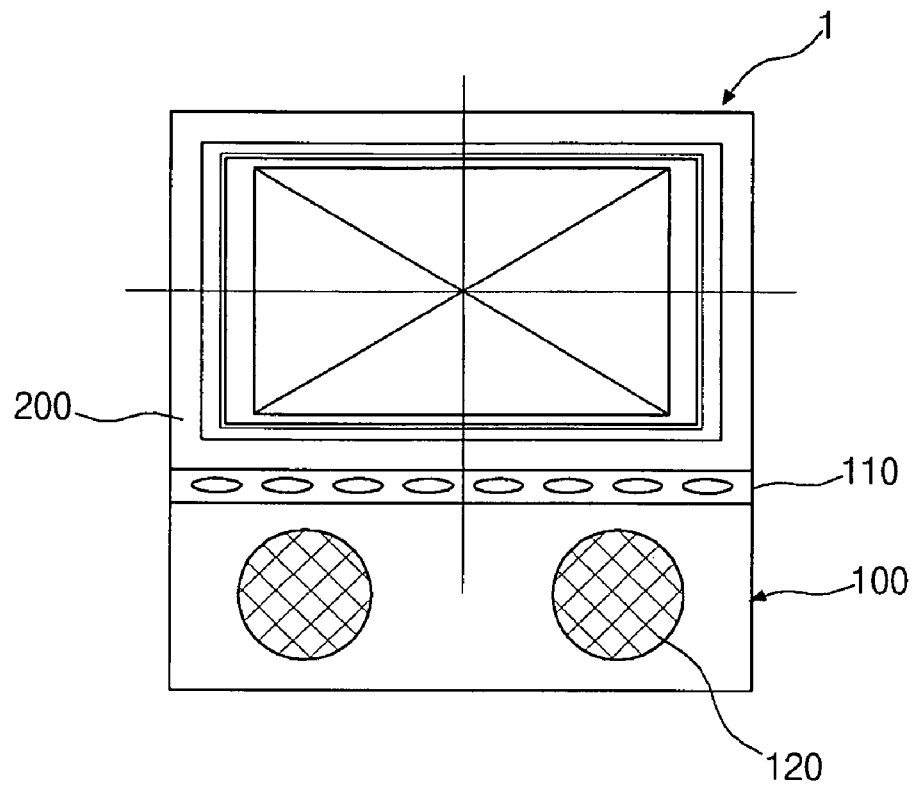
FIG. 1 is a front elevation view of an in-wall type multi-functional television set according to a first embodiment of the present invention.
Figure 2:
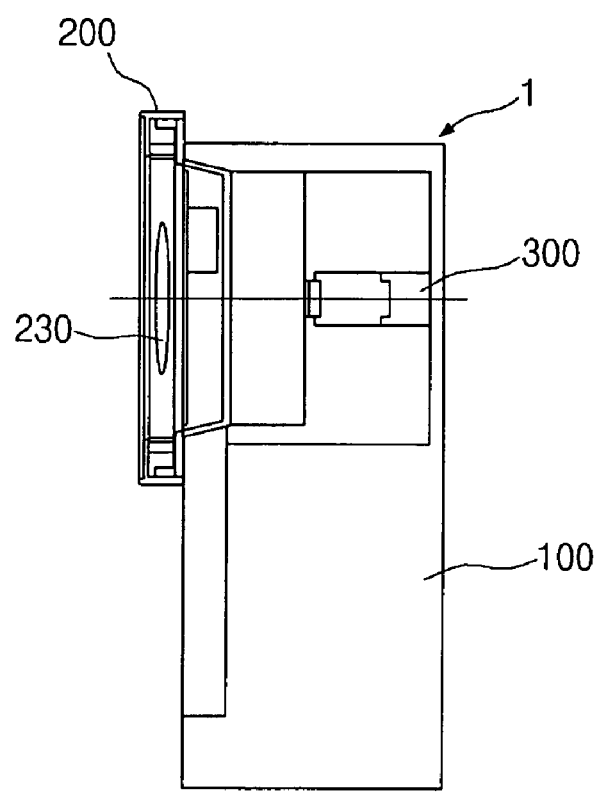
FIG. 2 is a sectional side view of an in-wall type multi-functional television set according to the first embodiment of the present invention.

FIG. 1 is a front elevation view of an in-wall type multi-functional television set according to a first embodiment of the present invention, and FIG. 2 is a sectional side view of an in-wall type multi-functional television set according to the first embodiment of the present invention. As shown in the drawings, an in-wall type multi-functional television set 1 according to the first embodiment of the present invention includes a main body 100, a monitor 200, and a connecting part 300. The main body 100 processes and outputs video and audio signals of a television signal. The monitor 200 receives and displays the video signal outputted from the main body 100. The connecting part 300 supports the monitor 200. A side of the connecting part 300 is connected to a desired position of an accommodating part 130 formed in the main body 100 and the other side thereof is connected to the monitor 200 to rotate up and down or right and left by a hinge.

The main body 100 is embedded in the bottom of a wall cabinet in the kitchen, a wall adjacent to a diner table, a bathroom wall, or the like. The accommodating part 130 is provided at an upper side of the main body 100, and is integrated with the main body 100. The monitor 200 is accommodated in the accommodating part 130. A television signal receiving circuit including a television tuner for receiving a broadcast television signal and extracting a video signal and an audio signal from the received broadcast television signal is installed in the main body 100. The video signal of the broadcast television signal outputted from the television signal receiving circuit is demodulated and transmitted to the monitor 200 to be displayed. The audio signal extracted from the broadcast television signal is converted into audible sound by and outputted through speakers 120 installed in the main body 100.

The main body 100 includes an input part 110. The input part 110 is provided at a lower side of the accommodating part 130 in which the monitor 200 is accommodated, and has a plurality of input keys for inputting manipulation commands. The speakers 120 are provided at a lower side of the input part 110. The speakers 120 convert the audio signal extracted from the television signal into audible sound, and output the audible sound.

Moreover, the main body 100 is also provided with an electric power supply. The electric power supply receives electric power such as alternating current supplied to the house, and converts the received electric power into electric power necessary for operating the main body 100 and the monitor 200 of the in-wall type multi-functional television set 1 according to the preferred embodiment of the present invention.

The monitor 200 includes a small-sized monitor, such as a liquid crystal display, for receiving the video signal from the main body 100 and for displaying the received video signal. The monitor 300 is connected to the main body 100 by a joint-type foldable connecting part 300 having a plurality of supports 310, and accommodated in the accommodating part 130 formed in the main body 100. Electric power is supplied to the monitor 200 from an electric power supply (not shown). The monitor 200 receives the video signal from the television signal receiving circuit of the main body 100 so as to display the received video signal on a monitor.

A side of the connecting part 300 is connected to a desired portion of the accommodating part 130 of the main body 100, and the other side of the connecting part 300 is connected to a rotating part 220 provided at a rear side of the monitor 200, so that the connecting part 300 supports the monitor 200. Moreover, the connecting part 300 has various foldable structures so as to allow the monitor 200 to be accommodated in the accommodating part 130 of the main body 100. Hereinafter, the connecting part 300 of the in-wall type multi-functional television set 1 according to the preferred embodiment of the present invention will be described in detail.

Figure 3:
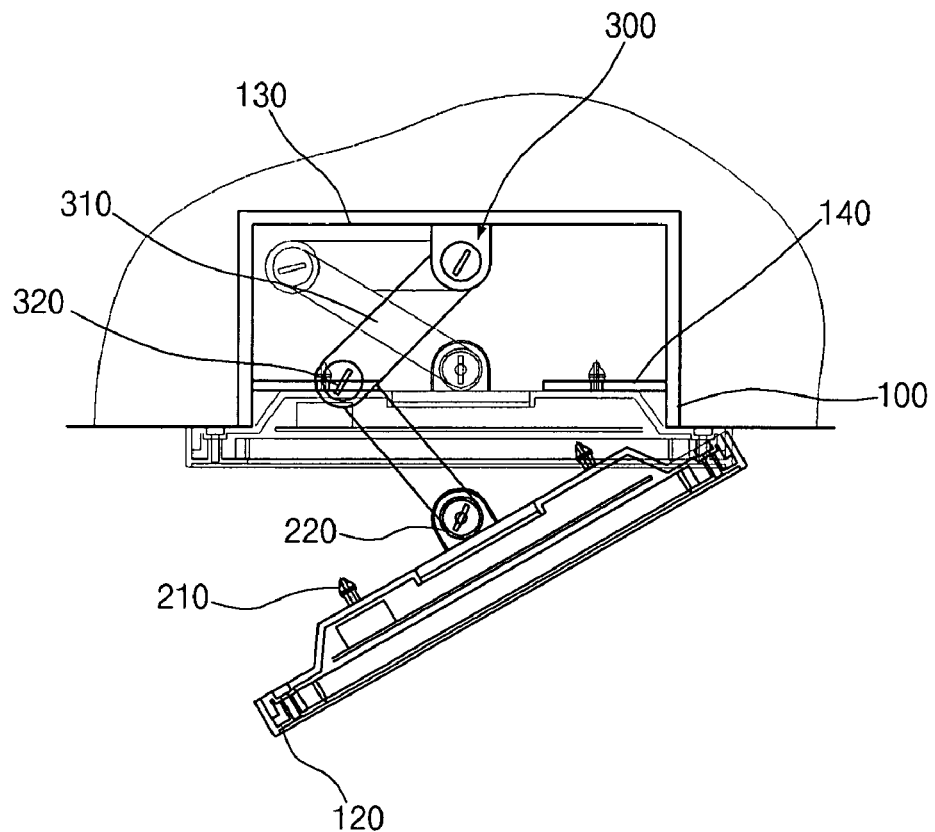
FIG. 3 is a view illustrating a state wherein a monitor of an in-wall type multi-functional television set according to the first embodiment of the present invention is accommodated in or withdrawn from the wall.
Figure 4:
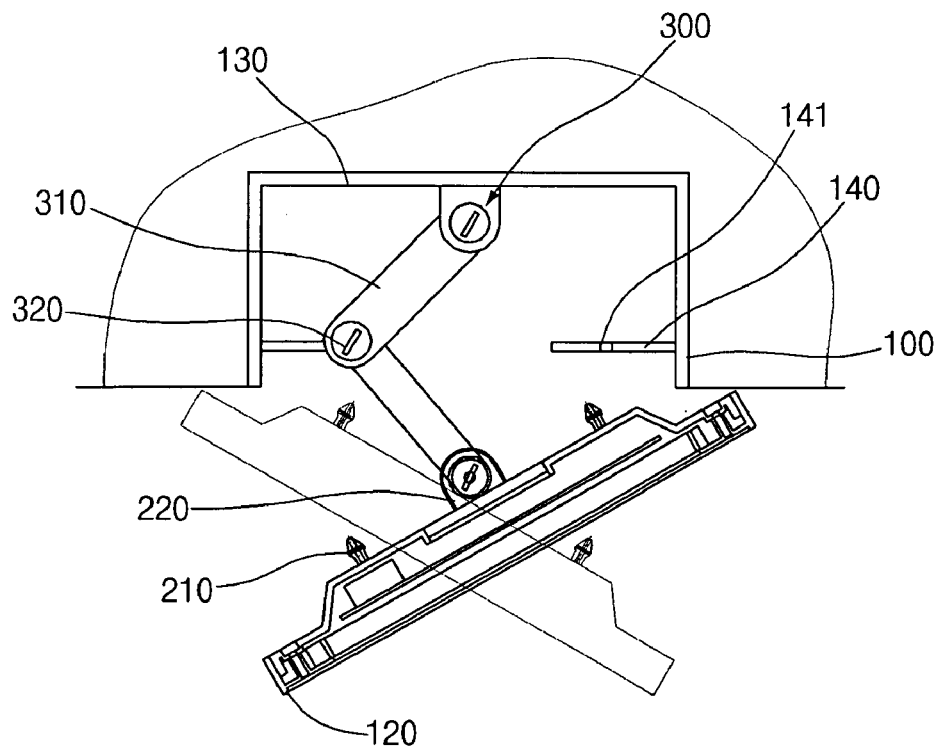
FIG. 4 is a view illustrating a state wherein the monitor in FIG. 3 is rotated right and left.

FIG. 3 is a view illustrating the state that the monitor 200 is accommodated in or withdrawn from the accommodating part 130 in accordance with the preferred embodiment of the present invention, and FIG. 4 is a view illustrating a state wherein the monitor 200 in FIG. 3 is rotated right and left. As shown in the drawings, according to the preferred embodiment of the present invention, the joint-type connecting part 300 of the in-wall type multi-functional television set 1 may include a plurality of foldable supports 310. The foldable supports 310 are hinged to each other at both ends thereof to be folded and unfolded.

In the case that the monitor 200 is accommodated in the main body 100, the foldable supports 310 of the connecting part 300 are folded about hinge shafts and accommodated in the main body 100. When a user withdraws the monitor 200 out of the main body 100, the foldable supports 310 of the connecting part 300 are unfolded so as to draw the monitor 200 out of the accommodating part 130. When the withdrawn monitor 200 is pushed into the accommodating part 130 of the main body 100 by the user, the unfolded supports 310 of the connecting part 300 are inserted into the connecting part 300 again. Therefore, the supports 310 are folded about the hinge shafts and the monitor 200 is accommodated in the accommodating part 130 of the main body 100.

Figure 5:
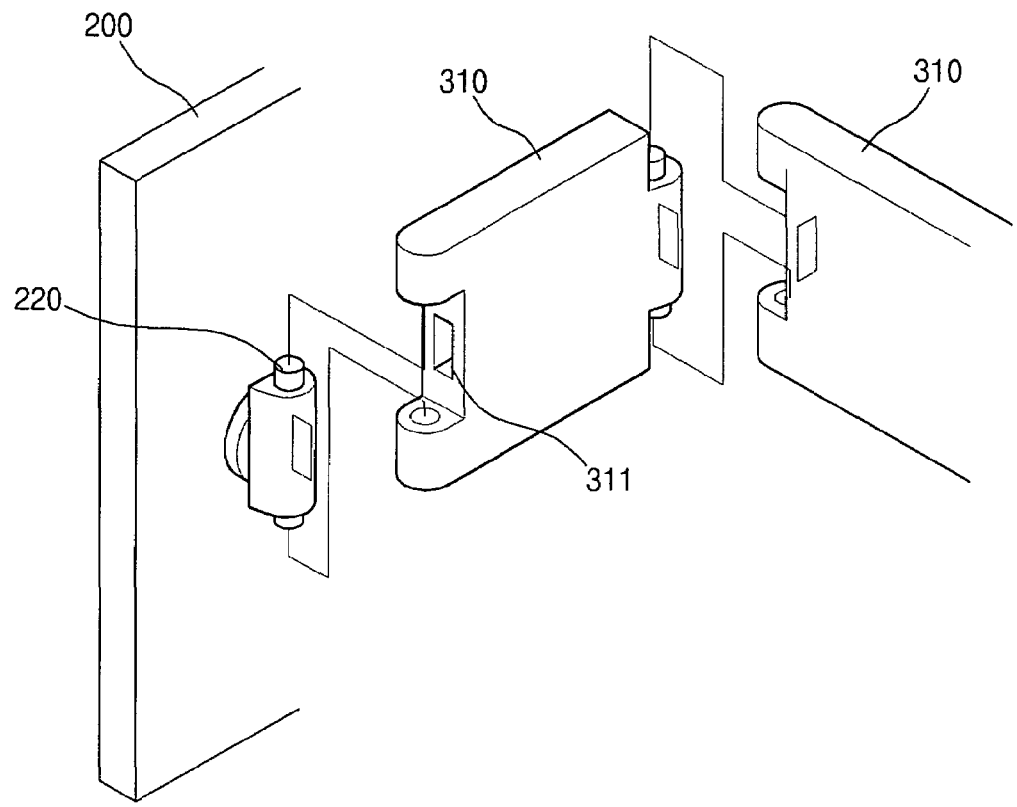
FIG. 5 is an exploded perspective view illustrating the structure of a rotating part of the monitor and an end of a connecting part of the in-wall type multi-functional television set according to the first embodiment of the present invention.

According to the preferred embodiment of the present invention, the monitor 200 is provided with the rotating part 220 at a rear side thereof. The rotating part 220 is connected to an end support 310 of the supports 310 to be rotated right and left about a hinge. The structure of the rotating part 220 is described in detail by reference to FIG. 5. FIG. 5 is an explored perspective view illustrating the structure of the rotating part 220 of the monitor 200 and an end of the connecting part 300 of the in-wall type multi-functional television set 1 according to the preferred embodiment of the present invention. As shown in FIG. 5, the rotating part 220 at the rear side of the monitor 200 is hinged to the main body 100, so that the end of the connecting part 300 for supporting the monitor 300 can be rotated right and left.

For instance, the rotating 220, which is provided at the rear central side of the monitor 200, may include a semicircular cylindrical shaft with hinge protrusions formed at upper and lower sides of the shaft. The end support 310 of the connecting part 300 may be formed with hinge recesses in which the hinge protrusions of the rotating part 220 are inserted. The hinge protrusions of the rotating part 220 are inserted into the hinge recesses of the end support 310 of the connecting part 300 so that the rotating part 220 is coupled to the monitor 200. Due to this coupling, the monitor 200 can be rotated right and left.

Therefore, the user can adjust the viewing angle of the monitor 200 of the in-wall type multi-functional television set 1 according to their position so at to watch the television.

According to the preferred embodiment of the present invention, the connecting part 300 of the in-wall type multi-functional television set 1 is formed with hollow cable passages 411 inside the respective supports 310. A power cable for supplying electric power necessary to operate the monitor 200 from the main body 100 to the monitor 200 and a cable, such as a flexible PCB, for transmitting the video signal such as RGB video signals to the monitor 200 pass through the hollow cable passages 311. The cables pass the hollow cable passages 311 of the supports 310 and are electrically connected to the monitor 200 and the main body 100. When the cables are installed outside the connecting part 300, the folding and unfolding movements of the connecting part 300 may be disturbed. The hollow cable passages 311 prevent the connecting part 300 from the disturbance. The cables are also prevented from damaging so their durability can be increased.

According to the preferred embodiment of the present invention, the monitor 200 is formed with inserting protrusions 210 for fixing the monitor 200 at the rear side of the monitor 200. The accommodating part 130 of the main body 100 is provided with brackets 140 at both sides of the accommodating part 130. The brackets 140 are integrated into the accommodating part 130 and formed with protrusion holes 141 in which the inserting protrusions 210 are inserted and fixed. The diameter of the inserting protrusions 210 is greater than that of the protrusion holes 141. The inserting protrusions 210 are inserted into the protrusion hole 141 by a press-fit. The inserted inserting protrusions 210 are caught at the protrusion holes 141 so as to maintain a tight pressed fit between the monitor 200 and the accommodating part 130 of the main body 100. Thus, the monitor 200 can be prevented from being withdrawn from the main body 100 due to shock or unpredictable external force.

According to the preferred embodiment of the present invention, the monitor 200 is provided with grip portions 230 (See FIG. 2) at both sides of the monitor 200 so that the monitor 200 may be conveniently withdrawn. The grips 230 serve as a kind of handle for easily drawing the monitor 200, and may be formed by grip recesses formed at both sides of the monitor 200 or grip steps protruding outward from both sides of the monitor 200. Hence, the user can easily draw the monitor 200 secured by the inserting protrusions 210 and the protrusion holes 141.

The operations of accommodating and drawing out the monitor 200 of the in-wall type multi-functional television set 1 as described above will be described in detail as follows. To watch the television, the user operates the in-wall type multi-functional television set 1 through the input part 110 provided at the front side of the main body 100. The television signal receiving circuit of the main body e 100 receives a signal corresponding to a broadcast channel that the user inputs through the input part 110 from the broadcast television signal received through an antenna. The received broadcast television signal is separated and extracted into the video signal and the audio signal, while the video signal is displayed on the monitor 200 and the audio signal is converted and outputted into the audible sound by the speakers 120 installed at the front side of the main body 100.

To watch the television conveniently, the user withdraws the monitor 200 from the main body 100 embedded in the walls of the kitchen or the bathroom. The user holds the grips 230 of both sides of the monitor 200 and pulls out the monitor 200. At this time, the inserting protrusions 210 are withdrawn from the protrusion holes 141 due to the pulling force, and, at the same time, the folded supports 410 of the connecting part 300 are rotated about the hinge shafts and the connecting part 300 is unfolded, so that the monitor 200 is withdrawn. If the monitor 200 is sufficiently withdrawn as much as desired by the user, the user can watch the television broadcast displayed on the monitor 200 by freely adjusting the viewing angle of the monitor 200 to suit his/her position by rotating the rotating part 220 hinged to the connecting part 300 right and left.

To finish watching the television, if the user inputs a termination signal to the in-wall type multi-functional television set 1 through the input part 110 at the front side of the main body 100, the electric power supply interrupts the electric power supplied to the in-wall type multi-functional television set 1 so that the operation of the in-wall type multi-functional television set is terminated.

If the user pushes the monitor 200 into the accommodating part 130 of the main body 100, the unfolded supports 310 are folded again and the monitor 200 is accommodated in the accommodating part 130. Simultaneously, the inserting protrusions 210 formed at the rear side of the monitor 200 are tightly fitted in the protrusion holes 141 due to the difference between the diameters of the inserting protrusions 210 and the protrusion holes 141. The inserted inserting protrusions 210 are caught by the protrusion holes 141 so as to maintain a tight pressed fit between the monitor 200 and the accommodating part 130 of the main body 100.

Figure 6:
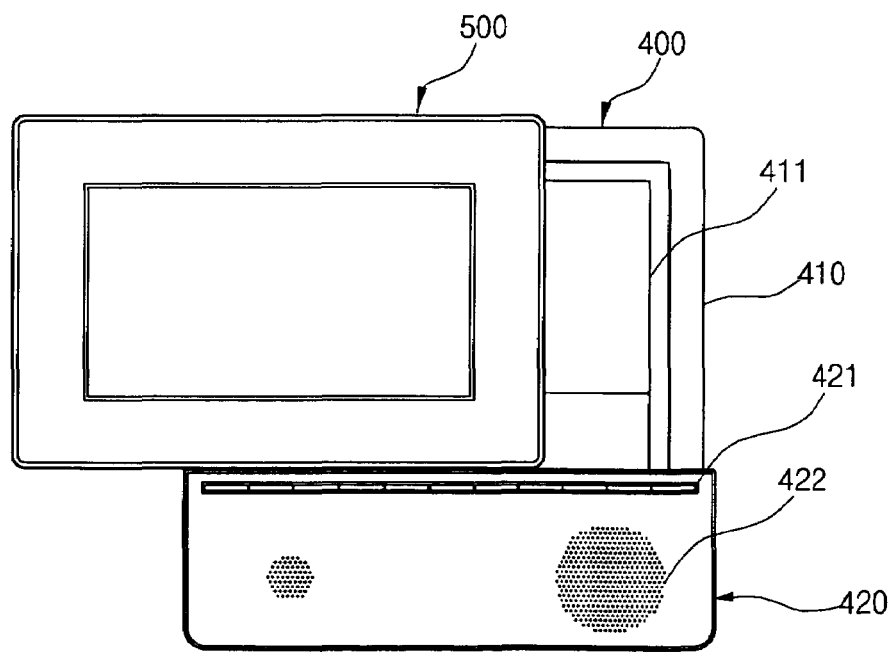
FIG. 6 is a front view of an in-wall type multi-functional television set according to a second embodiment of the present invention.
Figure 7:
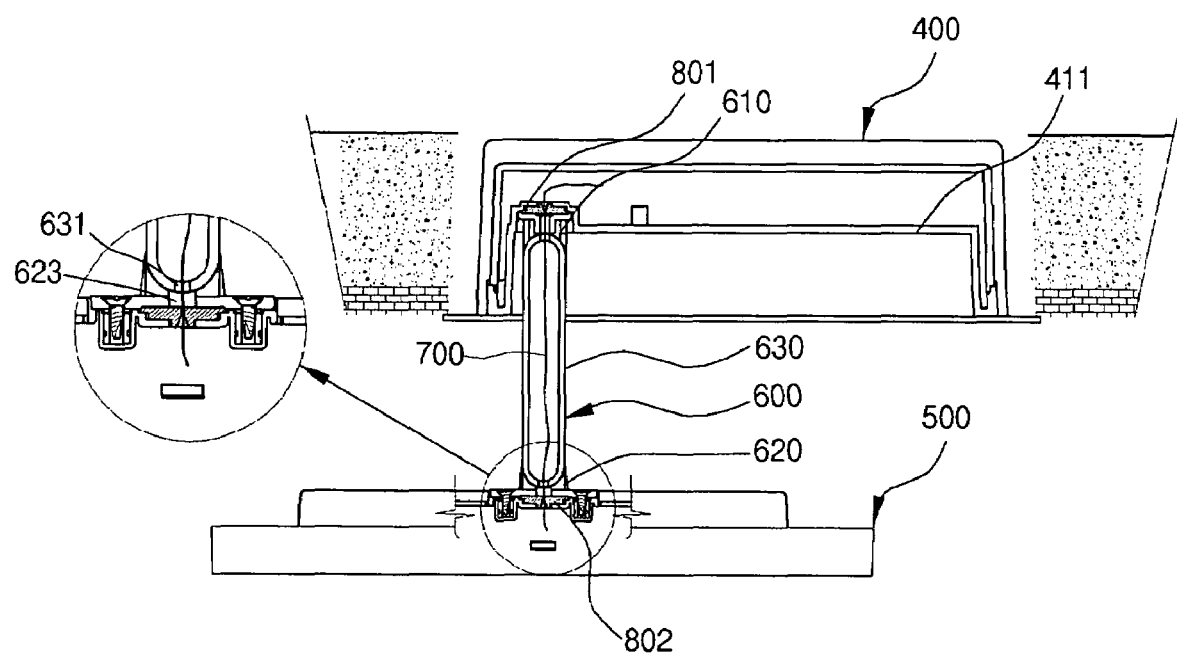
FIG. 7 is a plan sectional view of the in-wall type multi-functional television set in FIG. 6.
Figure 8:
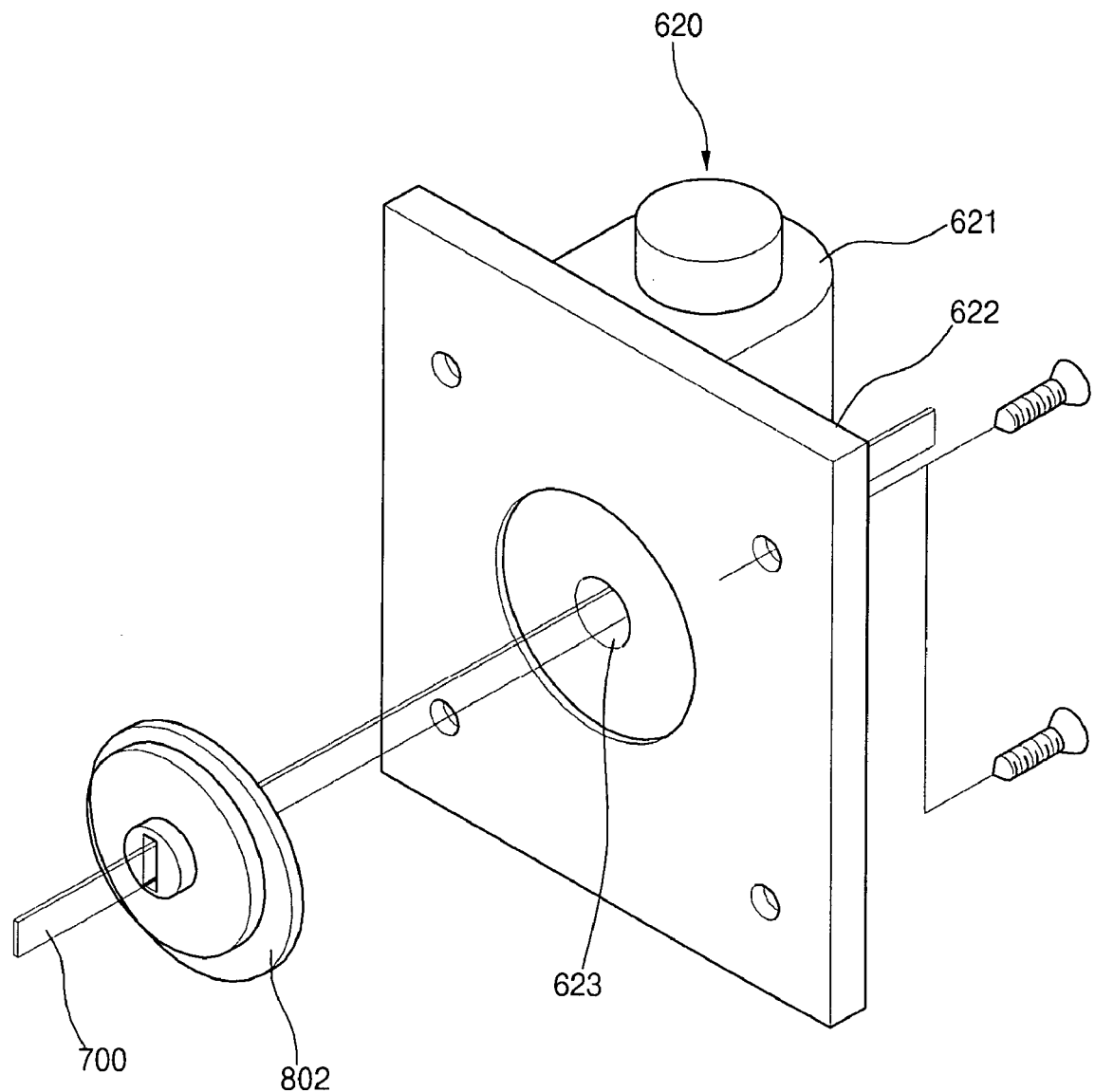
FIG. 8 is an exploded perspective view illustrating assembly of a second rotating part of the in-wall type multi-functional television set according to the second embodiment of the present invention.
Figure 9:
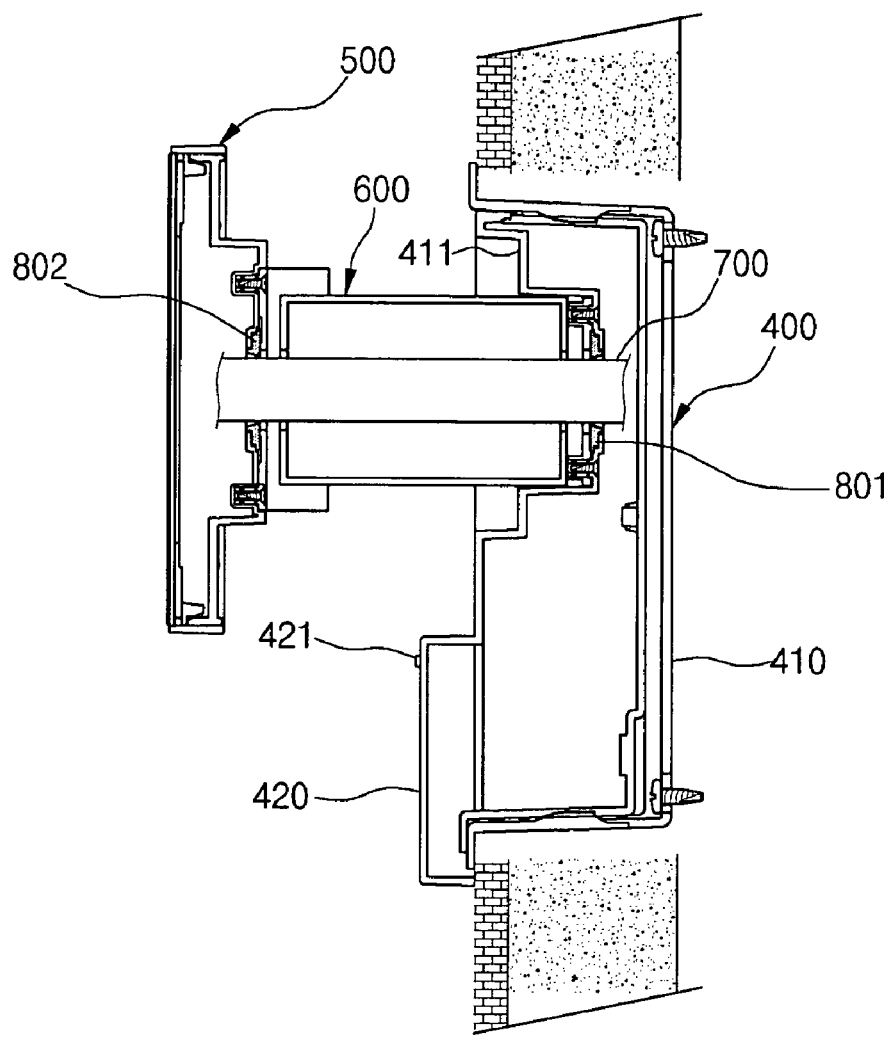
FIG. 9 is a side sectional view of the in-wall type multi-functional television set taken from FIG. 6.

FIG. 6 is a front view of an in-wall type multi-functional television set according to a second embodiment of the present invention, FIG. 7 is a plan sectional view of the in-wall type multi-functional television set in FIG. 6, FIG. 8 is an exploded perspective view illustrating an assembly of a second rotating part of the in-wall type multi-functional television set according to the second embodiment of the present invention, and FIG. 9 is a side sectional view of the in-wall type multi-functional television set taken from FIG. 6. As shown in the drawings, the in-wall type multi-functional television set according to the second embodiment of the present invention is installed in a wall of a house to partially expose, and includes a main body 400 having an accommodating part 411 formed at the front side of the main body 400 and accommodating a monitor, a housing 410 having a television signal receiving circuit for receiving and outputting a television signal from broadcasting signals, and a controller for controlling all the devices in the in-wall type multi-functional television set, and a case 420 with an input part 421 provided with a plurality of input buttons at the front side of the case 420 and speakers 422 for outputting an audio signal, a monitor 500 for displaying a video signal outputted from the television signal receiving circuit, cables 700 for transmitting the television signal outputted from the main body 400 to the monitor 500, and a connecting part 600 having an end fixed to the accommodating part 411 and the other end fixed to the rear side of the monitor 500 and supporting the monitor 500 which is accommodated in the accommodating part 411 of the main body 400 and withdrawn from the accommodating part 411.

The housing 410 of the main body 400, for example, is embedded in the wall of the kitchen, the bathroom, or the like, includes the accommodating part formed at the upper side of the housing 410 and accommodating the monitor 500, and a television signal receiving circuit for receiving a television signal and separating the television signal into an audio signal and a video signal. An video signal of the television signal outputted by the television signal receiving circuit is transmitted to and displayed by the monitor 500 through demodulating process of the video signal, and the audio signal is converted into audible sound and the audible sound is outputted by speakers 422 installed in the case 420 coupled to the housing 410.

The housing 410 of the main body 400 is coupled with the case 420 including the input part 421 having a plurality of input buttons through which a user inputs commands and disposed at the lower side of the accommodating part 411 in which the monitor 500 is accommodated, and the speakers 422 for converting the audio signal separated from the television signal into the audible sound and outputting the audible sound.

Moreover, the main body 400 is installed with a power supplying circuit (not shown) for converting electric power, for example, an alternating current supplied to the home into an electric power necessary to operate the main body 400 and the monitor 500 of the in-wall type multi-functional television set according to the present invention.

The monitor 500 receives the video signal outputted from the television signal receiving circuit of the main body 400, displays the received video signal, and is accommodated in the accommodating part 411 formed in the main body 400 by being connected to main body 400 via the connecting part 600. The monitor 500 receives the electric power supplied from the electric power supply (not shown) of the main body 400 and the video signal outputted from the television signal receiving circuit of the main body 400, and displays the received video signal.

The connecting part 600 is fixed to the accommodating part 411, and includes a first rotating part 610 having a fist hinge base (not shown) integrally formed with a first hinge shaft (not shown) and a hole (not shown) formed therein, a second rotating part 620 having a second hinge base 622 integrally formed with a second hinge shaft 621 and a hinge base 623 formed therein, a support 630 having a hollow cable passage 631 through which the cables 700 pass, one end hinged to the first rotating part 610, and the other end hinge to the second rotating part 620. The cables 700 pass the holes formed in the first and second rotating parts 610 and 620 and the hollow cable passage 631, and transmits the video signal outputted from the television signal receiving circuit to the monitor 500.

The support 630 of the connecting part 600 includes an end hinged to the first rotating part 610 which is provided at the side of the accommodating part 411 and is rotated horizontally, and the other end hinged to the second rotating part 620 which is provided at the rear side of the monitor 500 and rotated horizontally, so as to support the monitor 500 accommodated in and withdrawn from the accommodating part 411. The monitor 500 is accommodated in and withdrawn from the accommodating part 411 by the first and second rotating parts 610 and 620 hinged to the connecting part 600, and the monitor 500 is withdrawn from the accommodating part 411 so as to adjust the viewing angle thereof.

According to the aspect of the present invention, the first and second rotating parts 610 and 620 of the connecting part 600 of the in-wall type multi-functional television set are formed with holes through which the cables 700, such as a flexible PCB, or the like, for transmitting video signals such as RGB signals from the main body 400 to the monitor 500 and for supplying the electric power necessary to operate the monitor 500, and the support 630 has the hollow cable passage 631 formed corresponding to the first and second rotating parts 610 and 620 where the through which the cables 700 pass. The cables 700 are connected to the main body 400 and the monitor 500 via the hollow cable passage 631 and the hole formed at the ends of the support 630. Thus, the cables 700 are installed at the outside of the connecting part 600 and interfere with the folding of the connecting part 600 can be avoided, and damage to the cables 700 can be prevented, so that durability of the cables 700 is increased.

The first and second rotating parts 610 and 620 are fixed to the accommodating part 411 and the rear side of the monitor 500 by fixing devices such as screws by using the first hinge base (not shown) and the second hinge base 622 integrally formed with the first hinge shaft (not shown) and the second hinge shaft 621 respectively hinged to the support 630. However, since the in-wall type multi-functional television set according to the present invention is mounted in a location such as the kitchen, or the bathroom where water, moisture, or humidity may enter the in-wall type multi-functional television set according to the present invention, the user may touch the in-wall type multi-functional television set with wet hands. Thus, water, moisture, or humidity may enter the in-wall type multi-functional television set through the connecting part 600 and the cables 700 and may damage the same.

Therefore, according to another aspect of the present invention, the in-wall type multi-functional television set according to the present invention further includes rubber-made waterproofing packings 801 and 802 for preventing water from entering the in-wall type multi-functional television set according to the present invention. The first waterproofing packing 801 is inserted into the place where the first rotating part 610 is fixed to the accommodating part 411 and formed with a slit through the cables 700 pass, and the second waterproofing packing 802 is inserted into the place where the second rotating part 620 is fixed to the rear side of the monitor 500 and formed with a slit through which the cables 700 pass.

The waterproofing packings 801 and 802 are described in detail with reference to FIG. 8. As shown in the drawing, the second waterproofing packing 802 is made of rubber, and prevents water or humidity from entering the in-wall type multi-functional televisions set via the cables 700 for connecting the main body 400 with the monitor 500 using the elasticity of the second waterproofing packing 802 such that the second hinge base 622 formed at the second rotating part 620 presses the second waterproofing packing 802. Moreover, the portion where the accommodating part 411 is coupled to the first rotating part 610 is waterproofed in the same manner as shown in FIG. 8, so as to prevent water or humidity from entering the in-wall type multi-functional television set, and thus the internal circuits are prevented from damage.

The case 420, including the input part 421 having a plurality of input buttons, and the speakers 422 for outputting the audio signal outputted from the television signal receiving circuit, is attached to the front side of the housing 410 of the main body 400. In particular, since a user manipulates the in-wall type multi-functional television set with wet hands, water or humidity enters the case 420 and gathers in the case 420. The gathered water may damage the internal circuits contained within the case 420.

Figure 10:
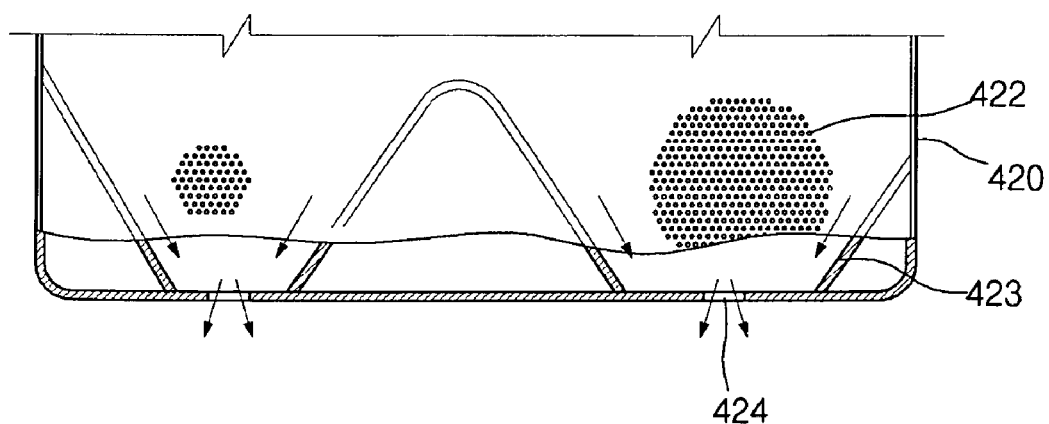
FIG. 10 is a schematic view illustrating a guide plate of a case of the in-wall type multi-functional television set according to the second embodiment of the present invention.

FIG. 10 is a schematic view illustrating a guide plate of the case 420 employed in the in-wall type multi-functional television set according to the second embodiment of the present invention. As shown in the drawing, the case 420 of the in-wall type multi-functional television set according to another aspect of the present invention further includes a guide plate 423 integrally and internally formed with the case 420 and allowing water or humidity, which has entered the in-wall type multi-functional television set via the input part 421 and the speakers 422, to flow toward a desired space in the case 420, and a drain hole 424 for draining out the gathered water or humidity by the guide plate 423 provided at the bottom of the case 420. The guide plate 423 has a wide upper side and narrow lower side so as to guide the entered water or humidity to flow into the desired space formed at the bottom of the case 420. The drain hole 424 is formed at the bottom of the case 420, and drains the water or humidity gathered by the guide plate 423 out of the case 420. Thus, water is prevented from gathering in the case 420, and the internal circuits are prevented from being damaged due to the gathered water.

Figure 11:
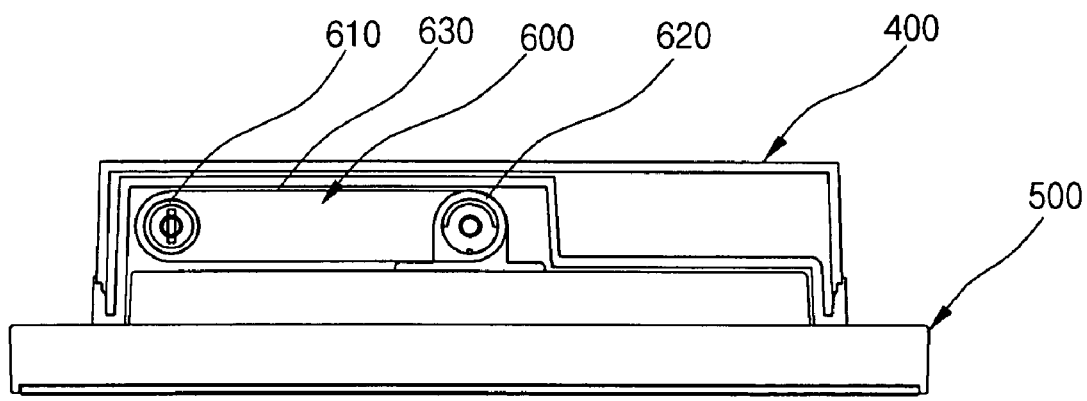
FIG. 11 is a view illustrating the accommodation of a monitor of the in-wall type multi-functional television set according to the second embodiment of the present invention.
Figure 12:
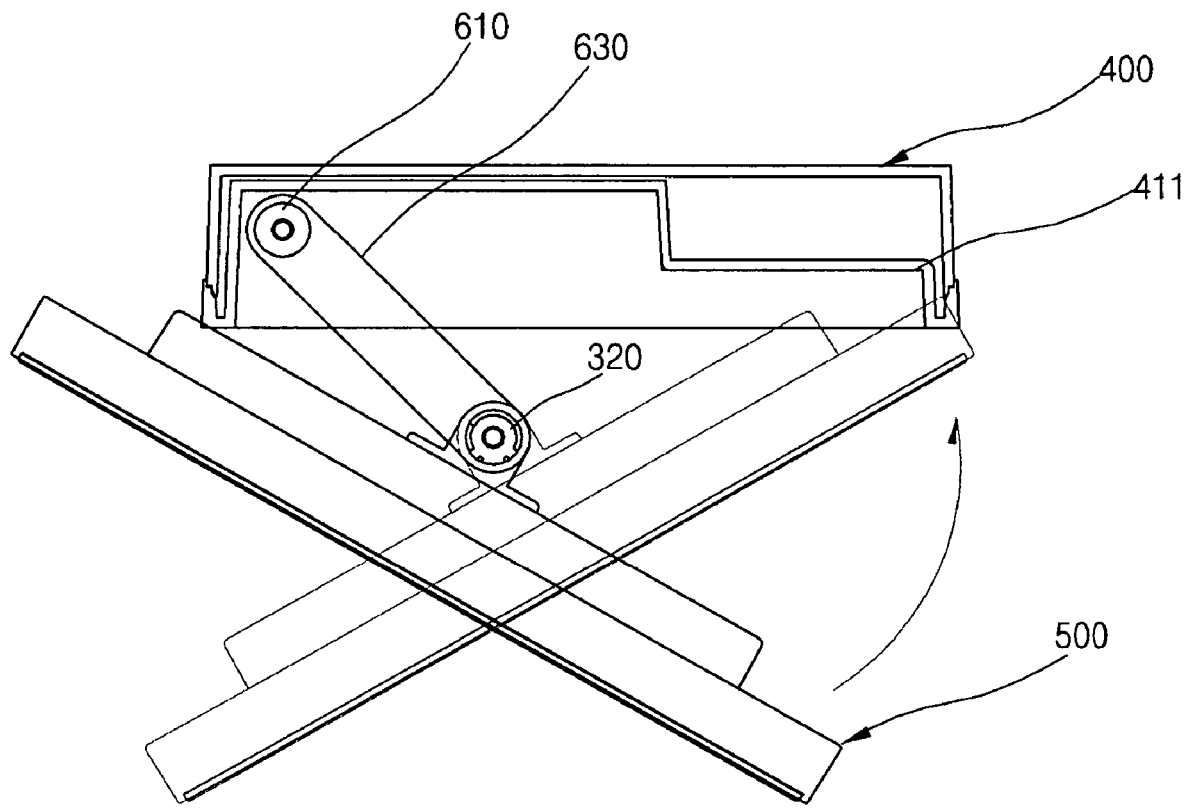
FIG. 12 is a view illustrating the withdrawal and the adjustment of the viewing angle of the monitor of the in-wall type multi-functional television set according to the second embodiment of the present invention as shown in FIG. 11.

Hereinafter, operation of the in-wall type multi-functional television set according to the preferred embodiment of the present invention will be described in detail. FIG. 11 is a view illustrating the accommodation of the monitor of the in-wall type multi-functional television set according to the second embodiment of the present invention, and FIG. 12 is a view illustrating the taking-out and the adjustment of the viewing angle of the monitor of the in-wall type multi-functional television set according to the second embodiment of the present invention as shown in FIG. 11. As shown in the drawings, when the monitor 500 of the in-wall type multi-functional television set according to the preferred embodiment of the present invention is accommodated in the accommodating part 422, the connecting part 600 having single support 630 is folded about the hinge shaft of the first rotating part 610 and the second rotating part 620. When the user grasps and withdraws the monitor 500, the folded connecting part 600 is rotated about the hinges of the first rotating part 610 and the second rotating part 620 and is withdrawn from the accommodating part 411. Moreover, when the user pushes the withdrawn monitor 500 into the accommodating part 411, the connecting part 500 is folded about the hinge shaft (not shown) of the first rotating part 610 and the hinge shaft 621 of the second rotating part 620 and is accommodated in the accommodating part 411, again.

The second rotating part 620 attached to the rear side of the monitor 500 may include a semi-circular cylindrical shaft having protruded hinges at the upper and lower sides thereof, and the support 630 of the connecting part 600 may be formed with hinge recesses into which the protruded hinges of the second rotating part 620 are inserted. When the protruded hinges formed at the upper and lower sides of the second rotating part 620 are inserted into the hinge recesses of the support 630 of the connecting part 600, the monitor 500 can be rotated horizontally. Thus, the user can adjust the viewing angle of the monitor 500 according to their position.

The in-wall type multi-functional television set according to the additional aspect of the present invention further includes a fixing device provided at the rear side of the monitor 500 and in the accommodating part 411 and fixing the monitor 500 in the accommodating part 411. The fixing device is described in detail with reference to FIGS. 13 and 14.

Figure 13:
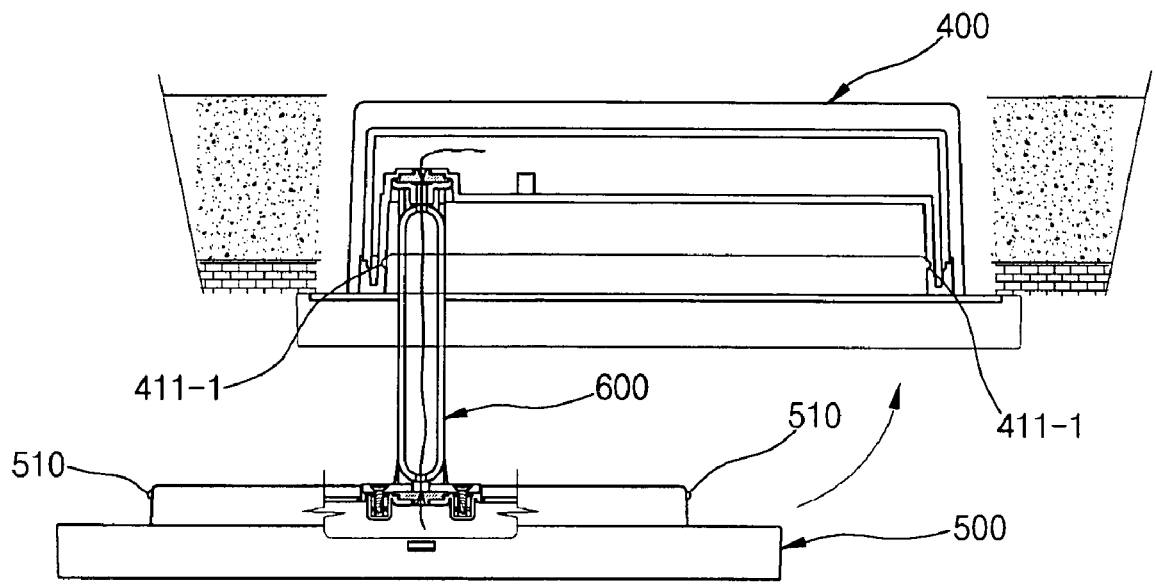
FIG. 13 is a plan sectional view illustrating a fixing device of the monitor of the in-wall type multi-functional television set according to the second embodiment of the present invention.

FIG. 13 is a plan sectional view illustrating the fixing device of the monitor of the in-wall type multi-functional television set according to the second embodiment of the present invention. As shown in the drawing, locking protrusions 510 are formed at the rear right and left sides of the monitor 500, and locking recesses 411-1, into which the locking protrusions 510 are inserted and fixed, formed at the inner right and left sides of the accommodating part 411 of the main body 400, corresponding to the positions of the locking protrusions 510 of the monitor 500.

When the user pushes the monitor 500 in the accommodating part 411 of the main body 400 to accommodate the monitor 500, the connecting part 600 is accommodated in the accommodating part 411 while the locking protrusions 510 at the rear sides of the monitor 500 are fitted into the locking recesses 411-1 at the inner sides of the accommodating part 411. Thus, the connection between the monitor 500 and the man body 400 is secured. Thereby, the monitor 500 is prevented from being unintentionally withdrawn from the main body 400 due to external shock.

Figure 14:
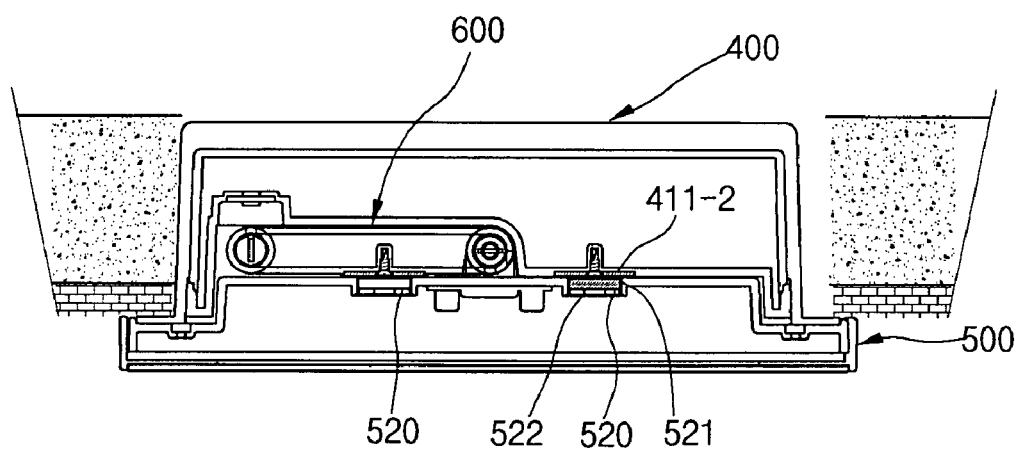
FIG. 14 is a plan sectional view illustrating a fixing device of the monitor of an in-wall type multi-functional television set according to another embodiment of the present invention.

FIG. 14 is a plan sectional view illustrating a fixing device of the monitor of an in-wall type multi-functional television set according to another embodiment of the present invention. As shown in the drawing, a permanent magnet 520 is attached to the rear side of the monitor 500, and a metal sheet 411-2 is fixed to the places of the accommodating part 411 of the main body 400, corresponding to the places of the permanent magnet 520 of the monitor 500, by screws. Moreover, a metal cover 521 covers the permanent magnet 520 so as to prevent the permanent magnet 520 from being separated from the rear side of the monitor 500. The permanent magnet 520 is coated with silicon 522 so as to prevent water or humidity from entering the monitor 500 and to secure the attachment of the permanent magnet 520.

When the user pushes the monitor 500 into the accommodating part 411, the monitor 500 is firmly fixed in the accommodated state by the magnetic force between the permanent magnet 520 at the rear side of the monitor 500 and the metal sheet 411-2 fixed to the corresponding place. In addition, if an additional metal sheet 411-2 is installed to a desired place of the support 630 of the connecting part 600 for connecting the monitor 500 to the main body 400 and an additional permanent magnet 520 is attached to the rear side of the monitor 500, the monitor 500 can be fixed more firmly.

Figure 15:
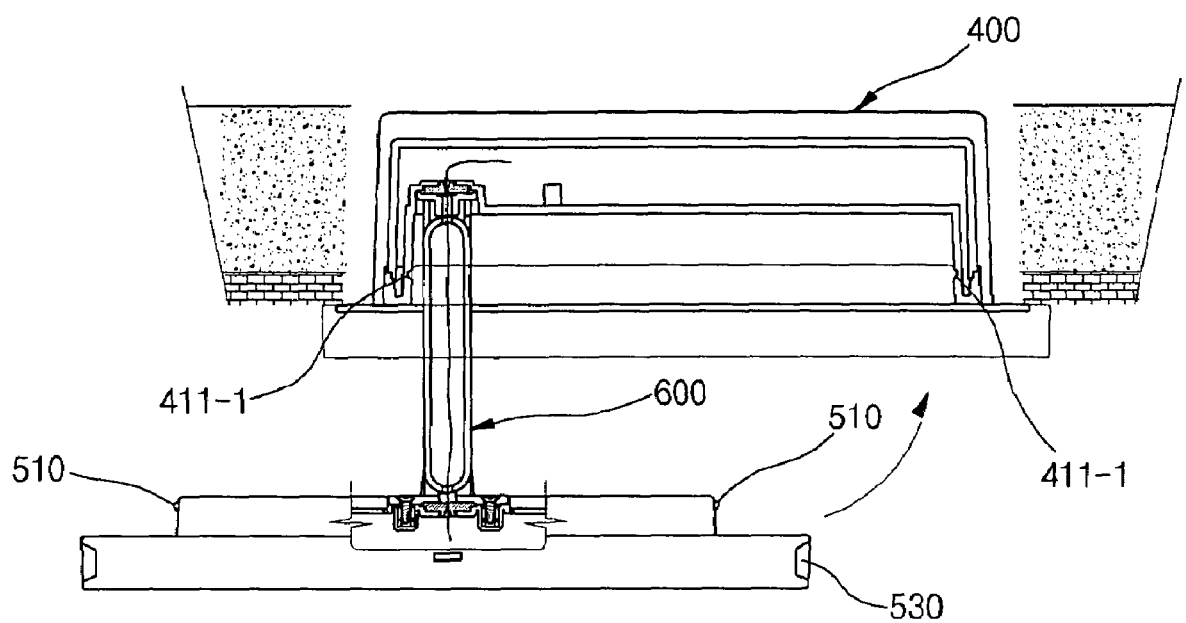
FIG. 15 is a view illustrating grips of the monitor of the in-wall type multi-functional television set according to the second embodiment of the present invention.

FIG. 15 is a view illustrating grips of the monitor of the in-wall type multi-functional television set according to the second embodiment of the present invention. As shown in the drawing, according to the additional aspect of the present invention, grips 530 are formed at the sides of the monitor 500 so that the monitor 500 may conveniently withdrawn from the accommodating part 411. The grips 530 serve as handgrips for conveniently withdrawing the monitor, fixed in the accommodating part 411 by the monitor-fixing device, from the accommodating part 411, and may be formed at the sides of the monitor 500 in the form of recesses or protrusions protruded outward therefrom. Thus, the user may easily withdraw the monitor 500 fixed in the accommodating part 411 by the monitor-fixing device out of the accommodating part 411.

The monitor 500 of the in-wall type multi-functional television set is accommodated in and withdrawn from the accommodating part 411 as follows. The user operates the in-wall type multi-functional television set through the input part 421 in order to watch the same. The television signal receiving circuit installed in the main body 400 receives the signal, corresponding to the broadcasting channel selected by the user through the input part 421, among the broadcasting television signals received through the antenna, and separates the video signal and the audio signal. The separated video signal is displayed on the monitor 500 and the separated audio signal is converted into the audible sound and the audible sound is outputted by the speakers 422.

The user withdraws the monitor 500 accommodated in the accommodating part 411 of the main body 400, which is embedded in the wall of the kitchen or the bathroom, in order to easily view the in-wall type multi-functional television set. The user grasps the grips 530 formed at the sides of the monitor 500 accommodated in the accommodating part 411 and pulls the monitor 500, the monitor 500, which is fixed by the monitor-fixing device having the locking protrusions 510 and the permanent magnet 520 of the monitor 500, the locking recesses 411-1 and the metal sheet 411-2 of the accommodating part 411, is withdrawn from the accommodating part 411. At that time, the folded connecting part 600 is withdrawn from the accommodating part 411 by rotating about the hinge shaft (not shown) of the first rotating part 610, so that the monitor 500 is withdrawn from the accommodating part 411. When the monitor 500 is withdrawn to the degree desired by the user, the user adjust the viewing angle of the monitor 500 according to their position using the second rotating part 620 of the connecting part 600, so as to watch the displayed television broadcast.

When the user inputs an ending command of the in-wall type multi-functional television set through the input part 421 in order to deactivate TV, the power supply shuts off electric power supply to the in-wall type multi-functional television set in order to end the operation of the same.

When the user pushes the monitor 500 into the accommodating part 411 of the main body 400, the connecting part 600 positioned at the outside of the accommodating part 411 is rotated about the hinge shaft (not shown) of the first rotating part 610 and the hinge shaft 621 of the second rotating part 620 and is folded so as to be accommodated in the accommodating part 411. At the same time, the monitor 500 is firmly fixed in the accommodating part 411 by the monitor-fixing device provided at the rear side of the monitor 500 and in the accommodating part 411.

Figure 16:
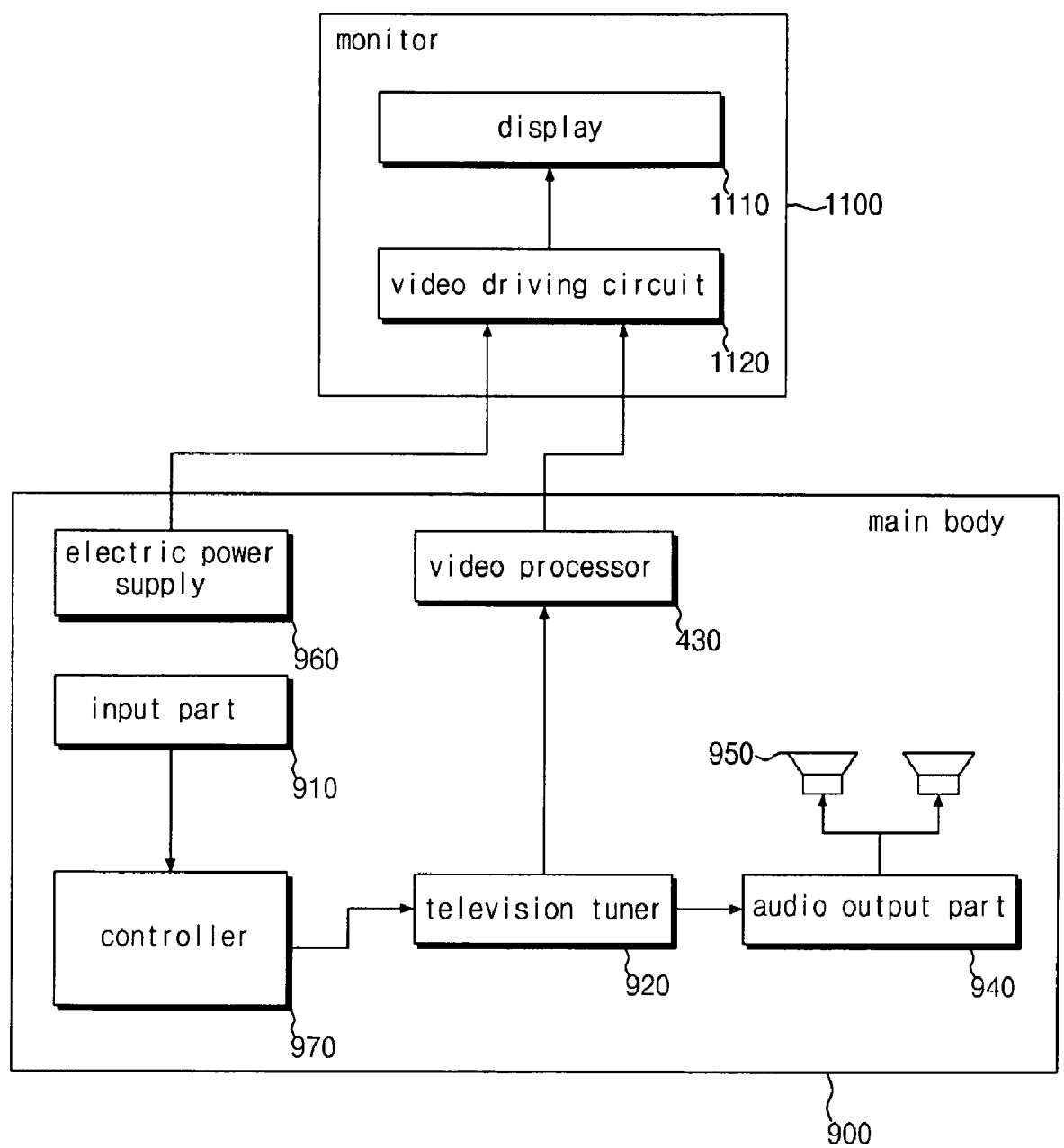
FIG. 16 is a schematic block diagram of the in-wall type multi-functional television set according to the preferred embodiment of the present invention.

FIG. 16 is a schematic block diagram of the in-wall type multi-functional television set according to the preferred embodiment of the present invention. As shown in the drawing, the in-wall type multi-functional television set according to the preferred embodiment of the present invention is embedded in the wall and includes a main body 900 for receiving the broadcast television signal, and processes and outputs the video and audio signals of the received broadcast television signal, and a monitor 1100 for displaying the video signal transmitted from the main body 900.

The main body 900 includes an input part 910, a television tuner 920, a video processor 430, an audio output part 940, the speakers 950, an electric power supply 960, and a controller 970. The input part 910 has a plurality of input keys through which the user inputs manipulation commands. The television tuner 920 separates and outputs a video signal and an audio signal from the broadcast television signal received through the antenna. The video processor 930 demodulates video data from the television tuner 920 into the video signal and outputs the demodulated video signal. The audio output part 940 demodulates the audio signal from the television tuner 920 into the audio signal and outputs the demodulated audio signal. The speakers 950 convert the audio signal demodulated by the audio output part 940 into audible sound and output the converted audible sound. The electric power supply 960 supplies the electric power necessary to operate the in-wall type multi-functional television set. The controller 970 controls overall operation of the in-wall type multi-functional television set, and outputs control signals to respective components of the in-wall type multi-functional television set in accordance with the manipulation commands inputted from the input part 910.

The input part 910 has a well-known structure and is installed with a plurality of keys for inputting the manipulation commands at a front side of the in-wall type multi-functional television set. The input part 910 transmits the manipulation commands inputted by the user to the controller 970.

The television tuner 920 selectively receives a broadcast television signal corresponding to a broadcast channel that the user want to watch from the broadcast television signal received through the antenna of the main body 900. The broadcast television signal is received as a signal mixed with the video signal and the audio signal. The television tuner 920 separates and outputs the video signal and the audio signal from the received broadcast television signal. The video signal separated by the television tuner 920 is transmitted to the video processor 930 and the audio signal is transmitted to the audio output part 940. The television tuner 920 may be a conventional analogue broadcasting tuner such as an NTSC type tuner, a PAL type tuner, or a television tuner for receiving both NTSC and PAL signals. According to another embodiment of the present invention, the television tuner 920 may be a digital multimedia broadcasting type tuner based on a satellite or a mobile communication multimedia broadcasting type tuner such as multimedia broadcasting based on a wireless LAN.

According to the preferred embodiment of the present invention, a composite video blanking and sync signal is used as the video data separated by the television tuner 150 and outputted to the video processor 930. The CVBS signal is known as a signal in which a plurality of video data such as a chromatic aberration signal, a brightness signal, and a synchronization signal are mixed into one signal.

The video processor 930 extracts and demodulates the video data from the CVBS signal outputted from the television tuner 920. The video processor 930 converts the demodulated video data into video data such as an RGB signal divided into respective RGB signals, and outputs the converted video data to the monitor 1100. The audio output part 940 converts the audio signal separated from the broadcast television signal by the television tuner 920 into an audio signal suitable to the in-wall type multi-functional television set and outputs the converted audio signal to the speakers 950.

The electric power supply 960 receives electric power such an alternating current electric power supplied to the home and converts the electric power into an electric power necessary to operate the main body 900 and the monitor 1100 of the in-wall type multi-functional television set of the present invention.

The controller 970 controls overall operation of the in-wall type multi-functional television set in accordance with the commands inputted by the user and the operating state of the in-wall type multi-functional television set. The controller 970 is assisted by a convenient application such as a virtual machine, and can control overall operation of the in-wall type multi-functional television set through software. If an event, such as manipulation commands inputted through the input part 910 by the user, occurs, the controller 970 generates controlling commands necessary to control respective components of the in-wall type multi-functional television set.

The monitor 1100 is accommodated in the accommodating part (not shown) of the main body 900, or is withdrawn by the user. The monitor 1100 includes a display 1110 and a video driving circuit 1120. The display 1110 displays the video signal generated from the video processor 930. The video driving circuit 1120 receives the video signal transmitted from the video processor 930 and converts the video signal into display data suitable to the display 1110.

The display 1110 may have a well-known structure such as a liquid crystal display, and displays the video signal transmitted from the main body 900. The video driving circuit 1120 receives the video signal such as an RGB signal transmitted from the video processor 930 of the main body 900 and converts the video signal into data suitable to the display 1110. For instance, the video driving circuit 1120 scales the received video signal by performing interpolation and decimation to suit the resolution of the display 1110.

In addition, the video driving circuit 1120 includes a CODEC for storing the video data in a memory and compressing/decompressing the video data. The CODEC includes an MPEG encoder/decoder and a JPEG encoder/decoder for compressing, storing, and reading a captured video frame into a still image. The MPEG encoder/decoder and the JPEG encoder/decoder are implemented with a DSP and cores. Additionally, the video driving circuit 1120 may include a sharpness improving circuit for improving image quality, and additional functions for adjusting contrast and brightness. Further, the video driving circuit 1120 may include several simple filters for providing graphic effects.

Figure 17:
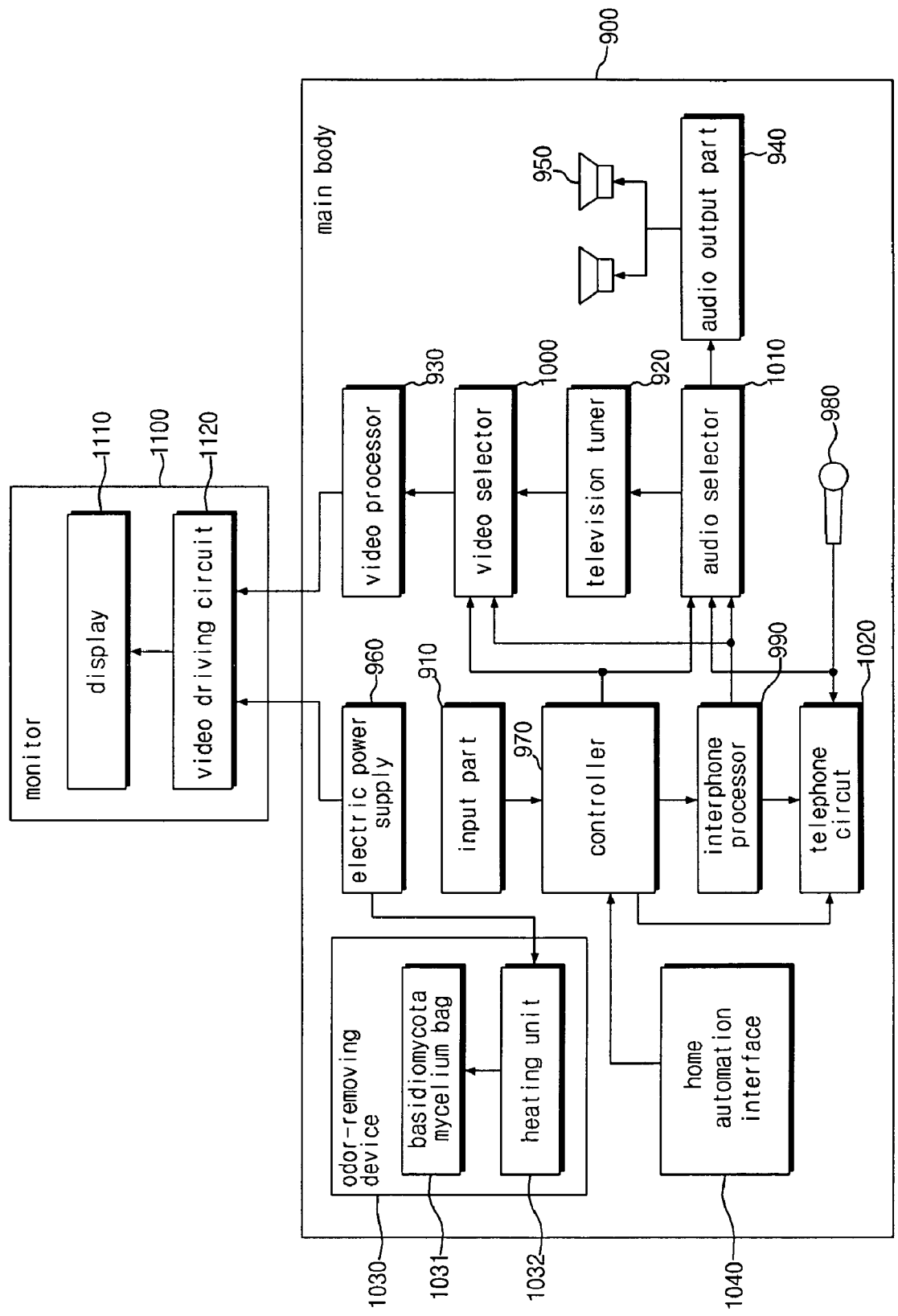
FIG. 17 is a schematic block diagram of the in-wall type multi-functional television set according to another preferred embodiment of the present invention.

FIG. 17 is a schematic block diagram of the in-wall type multi-functional television set according to another preferred embodiment of the present invention. As shown in the drawing, the main body 900 of the in-wall type multi-functional television set includes a main body microphone 980, an interphone processor 990, a video selector 1000, and an audio selector 1010. The main body microphone 980 converts and outputs voice generated by the user into an electric audio signal. The interphone processor 990 receives and outputs a video signal and an audio signal of a visitor from a camera and an interphone microphone installed in an interphone mounted at the entrance of the home. The interphone processor 990 outputs the user's audio signal inputted from a main body microphone 980 provided in the main body 900 to a voice output device such as the speakers 950 of the interphone. The video selector 1000 outputs one of the video signals inputted from the television tuner 920 or the interphone processor 990 to the video processor 930. The audio selector 1010 outputs one of the audio signals inputted from the television tuner 920 and the interphone processor 990 to the audio output part 940.

When a visitor visits the user's home and presses a call button on the interphone, the controller 970 detects that the call button has been pressed and informs the user that the visitor is waiting through the speakers 950 of the main body 900. For instance, when the user presses a certain input button of the input part 910, the controller 970 receives the input signal due to the input button and operates the interphone processor 990. The interphone processor 990 receives the video signal and the audio signal of the visitor from the outdoor interphone, and outputs the video signal and the audio signal to the video selector 1000 and the audio selector 1010, respectively. The interphone processor 990 receives the user's audio signal from the main body microphone 980 of the main body 900 and outputs the user's audio signal to the voice output device of the outdoor interphone.

The video selector 1000 outputs one of the video signals outputted from the television tuner 920 and the interphone processor 990 to the video processor 930 in accordance with the control signal from the controller 970. The video processor 930 converts the received video signal into a video signal such as an RGB signal and transmits the converted signal to the video driving circuit 1120. The video driving circuit 1120 displays the video signal through the display 1110.

The audio selector 1010 outputs one of the audio signals from the television tuner 920 and the interphone processor 990 to the audio output part 940 in accordance with the control signal from the controller 970. The audio output part 940 converts the audio signal into an audible frequency through the speakers 950.

According to the preferred embodiment of the present invention, the main body 900 of the in-wall type multi-functional television set includes a telephone circuit 1020. The telephone circuit 1020 receives a ring signal and an audio signal through a telephone line and outputs them to the audio selector 1010. The telephone circuit 1020 transmits the audio signal outputted from the main body microphone 980 through the telephone line.

The telephone circuit 1020 detects the ring signal inputted through the telephone line connected to the main body 900 and transmits a notice that there is a telephone call to the controller 970. When the ring signal is detected by the telephone circuit 1020, the controller 970 detects the ring signal, outputs the detected ring signal to the audio output part 1010, and informs the user that there is a telephone call through the display 1110. When the user presses a certain input button of the input part 910, the telephone circuit 1020 transmits the audio signal transmitted through the telephone line to the audio selector 1010, and the controller 970 generates a control signal to output the audio signal to the audio output part 940. The telephone circuit 1020 transmits the user's audio signal to the other party connected through the telephone line by transmitting the user's audio signal inputted from the main body microphone 980 through the telephone line. Therefore, the user can receive the telephone call by using the in-wall type multi-functional television set of the present invention.

According to another preferred embodiment of the present invention, the main body 900 of the in-wall type multi-functional television set includes an odor-removing device 1030 for removing an indoor offensive odor and generating oxygen. The odor-removing device 1030 includes a basidiomycota mycelium bag 1031 and a heating unit 1032 made of one of plastic, ceramic, and glass in which an electric heating device is installed. The basidiomycota mycelium bag 1031 is located near the heating unit 1032. When the heating unit 1032 projects infrared rays at a wavelength of 1,200 nm to 1,250 nm onto the basidiomycota mycelium, cultivated products of the basidiomycota mycelium have an excellent odor-removing effect. The cultivated products activate the oxygen in the air by negatively ionizing of the air so as to neutralize the positive ions, the main cause of odors.

According to another embodiment of the present invention, the main body 900 of the in-wall type multi-functional television set includes a home automation interface 1040. The home automation interface 1040, which is electrically connected to a computer for controlling a home automation installed in the home, receives and transmits manipulation commands for appliances present in the home. Rapid development of industry causes modern people to consider a house not only as a residential space, and home automation technologies are being developed to provide residents convenience by using a computer and communication technologies.

In brief, home automation allows automatic control and management of electricity, water supply, heating, locks, and the like by using the computer and the electronic communication technologies. Home automation is being developed to achieve the goal of controlling home appliances indoors or outdoors by using a single terminal. A computer and apparatuses using wired LAN or wired Internet are commonly used already for home automation.

The in-wall type multi-functional television set according to the present invention includes the home automation interface 1040, which has a wired or wireless connection to a computer for controlling the home automation, for receiving and transmitting manipulation commands necessary to control home appliances.

For instance, when a user drives a boiler of a house for the purpose of heating, the user starts to operate the boiler installed at a desired place in the house by manipulating a controller. However, in the in-wall type multi-functional television set 1 interfacing with a computer for controlling a house in which home automation is installed, the in-wall type multi-functional television set receives a command for driving the boiler from the user and transmits the command to the computer for controlling home automation. The computer receives the command and transmits a driving command to the boiler by using communication technology such as LAN or Bluetooth.

INDUSTRIAL APPLICABILITY

As described above, according to the in-wall type multi-functional television set, there is no necessity to prepare a space for installing the in-wall type multi-functional television set by embedding the in-wall type multi-functional television set in a wall and drawing the monitor out by using a foldable connecting part. Moreover, it is possible to develop a compact in-wall type multi-functional television set.

Moreover, according to the in-wall type multi-functional television set of the present invention, the monitor is hinged to the connecting part to be rotated right and left so that the viewing angle of the monitor to be withdrawn from the main body can be properly adjusted based on the user's position.

Moreover, the waterproofing part is provided to the rotating part and the connecting part installed to the monitor and the main body, so that the in-wall type multi-functional television set according to the present invention can be protected from water, moisture, or humidity, which may enter through the cables so as to prevent the internal circuits from being damaged.

In addition, the drain hole for draining the entered water, moisture, or humidity out of the case is further formed in the case having the input part and the speakers, so as to prevent the entered water, or the like from remaining in the case and the internal circuits in the case from being damaged due to the entered water, or the like.

Further, the fixing device is provided to the main body and the monitor so as to prevent the monitor from being unintentionally withdrawn the accommodating part.

Further, by processing and outputting a video signal and an audio signal of a visitor transmitted from an outdoor interphone, the user can easily identify the visitor and also have a conversation with the visitor.

By informing the user of an incoming call via the telephone circuit to the user by means of the speakers or the monitor of the monitor and connecting the incoming call, it is possible to receive the telephone call without use of a telephone.

As described above, since the in-wall type multi-functional television set of the present invention includes an odor-removing device constructed with a basidiomycota mycelium bag and a heater having an electric heating device, it is possible to remove indoor odor permanently.

Since the in-wall type multi-functional television set of the present invention includes an interface enabling reception and transmission of manipulation commands from and to a computer or a controller for controlling the home automation installed in the home, the user can manipulate home appliances by simply inputting the manipulation commands through the in-wall type multi-functional television set of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An in-wall type multi-functional television set embedded in a wall, comprising:
    a main body embedded into a wall, the main body including: an accommodating part formed in the front side of the main body; a television signal receiving circuit for receiving and outputting a television signal; a housing including a controller for controlling all devices in the in-wall type multi-functional television set; and a case including an input part provided with a plurality of input buttons and speakers for outputting an audio signal;
    a monitor accommodated in and drawn out from the accommodating part to be protruded toward a user, and including: a display for displaying a video signal outputted from the television signal receiving circuit, and a video processing circuit for converting the video signal outputted from the television signal receiving circuit to display data suitable to be displayed by the display and outputting the converted video signal;
    cables for transmitting the television signal outputted from the television signal receiving circuit to the video processing circuit;
    a connecting part including: a first rotating part fixed to a side of the accommodating part, and having a first hinge shaft, a first hinge base integrally formed with the first hinge shaft, and a hole formed therein; a second rotating part fixed to the rear side of the monitor, and having a second hinge shaft, a second hinge base integrally formed with the second hinge shaft, and a hollow cable passage formed therein through which the cables pass, and a support having an end hinged to the first rotating part and the other end hinged to the second rotating part;
    a first waterproofing packing inserted into the place where the first rotating part is fixed in the accommodating part, and formed with a slit through which the cables pass; and
    a second waterproofing packing inserted into the place where the second rotating part is fixed to the rear side of the monitor, and formed with a slit through which the cables pass.

2. The in-wall type multi-functional television set as set forth in claim 1, wherein the case further comprises:
    a guide plate formed integrally with the case, having a wide upper side and a narrow lower side, and guiding water, moisture, or humidity entered into the case through the input part and the speakers; and
    a drain hole for draining the water, moisture, or the humidity gathered by the guide plate provided at the bottom of the case, out of the case.

3. The in-wall type multi-functional television set as set forth in claim 2, wherein the monitor further comprises a locking protrusion formed at the rear right and left sides of the monitor and integrally formed with the monitor, and the main body further comprises a locking recess, formed at the place of the accommodating part corresponding to the place where the locking protrusion is formed, into which the locking protrusion is inserted.

4. The in-wall type multi-functional television set as set forth in claim 2, wherein the monitor further comprises a waterproof-treated permanent magnet attached to the rear side of the monitor, and the main body further comprises a metal sheet provided in the accommodating part and attached to the magnet.

* * * * *